United States Patent Office 3,312,120
Patented Apr. 4, 1967

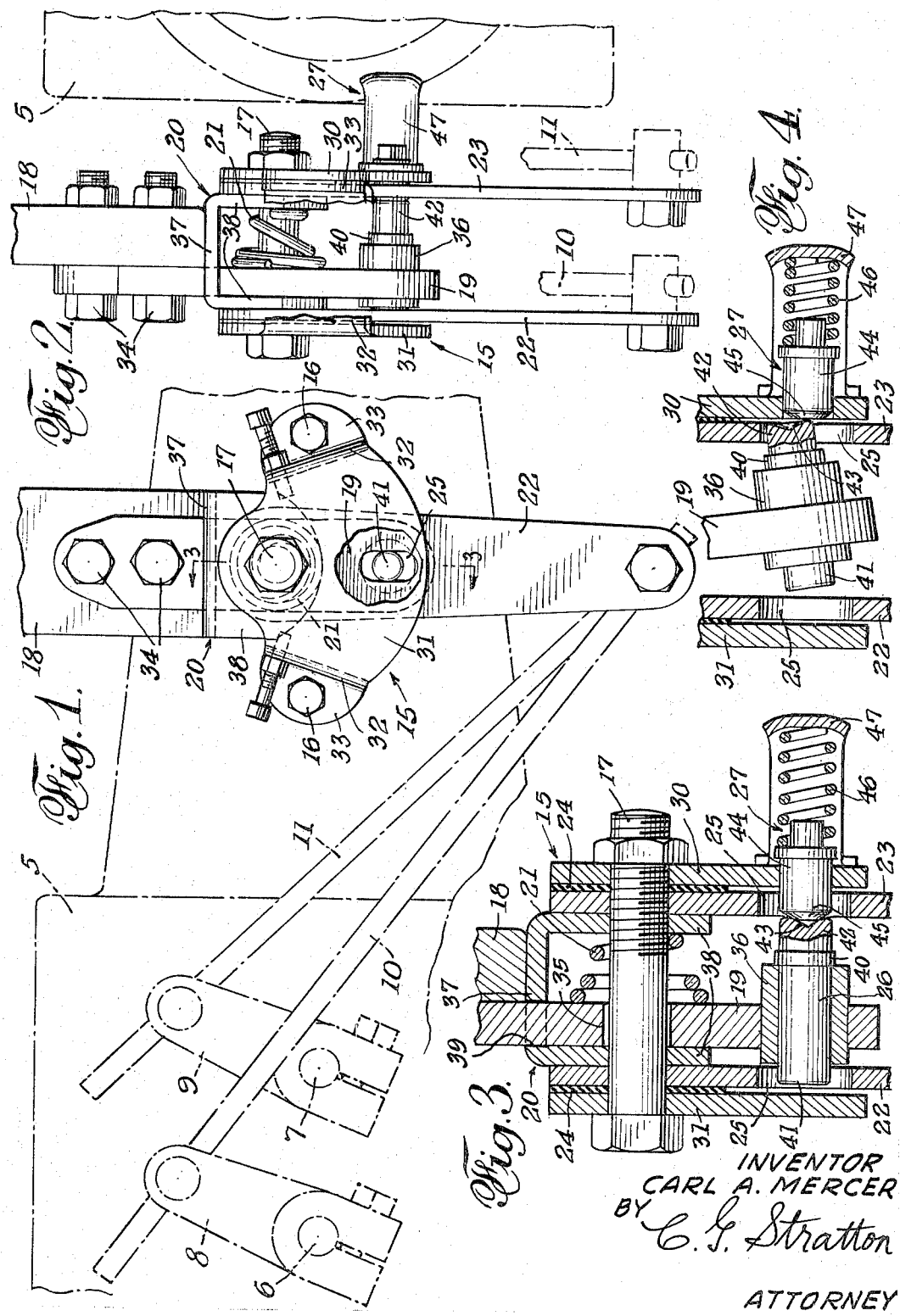

3,312,120
GEARSHIFT LOCKING MEANS
Carl A. Mercer, 21300 Sherman Way,
Canoga Park, Calif. 91303
Filed May 3, 1965, Ser. No. 452,940
7 Claims. (Cl. 74—475)

This invention relates to locking means of a gearshift of the stick type.

An object of the invention is to provide locking means for the arms that are moved by the stick that shifts gears thereby insuring that only one or the other of said arms, and not both together, are moved in a gearshifting operation. Thus, the invention is characterized by safety for the gears that are moved into and out of driving mesh in a gear box, and prevents stripping of gears and minimizing wear thereon.

This invention also has for its objects to provide such means that are positive in operation, convenient in use, easily installed in a working position and easily disconnected therefrom, economical of manufacture, relatively simple, and of general superiority and serviceability.

The above objects are realized in a device that is ordinarily mounted on the transmission or gear box that leads from an engine to the live axle or propeller shaft. In this instance, a single stick is used as the shift lever. The gear box is of the selective type in which one gear spool is moved in one direction for effecting a drive at one ratio and in the opposite direction for effecting a drive at another ratio, and a second gear spool is moved in one direction or the other to effect a drive at either a third ratio or a reverse drive. Such gear spools are ordinarily shifted by rocking outer arms of two rockshafts so that inner yokes on said shaft are similarly rocked to shift the spools. The device that embodies the present invention includes two shift arms to which the mentioned arms on said rockshafts are connected, as by rods or links, a shift stick that is movable to four gearshift positions, and locking means carried by the stick and connectable only with one or the other of the shift arms at a time, so that both said arms cannot be moved at the same time, thereby preventing shift of the gear spools in the transmission in a manner that would clash gears in said transmission.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a side elevational view of gearshift locking means embodying the objects of the present invention.

FIG. 2 is an end elevational view thereof, partly broken away.

FIG. 3 is an enlarged and fragmentary vertical sectional view as taken on the line 3—3 of FIG. 1 with the device in one arm-locking position.

FIG. 4 is a sectional view taken on the same line with the device in the other arm-locking position.

FIGS. 1 and 2, in dot-dash lines, show a selective transmission 5 on which the present device is mounted, the mounting means being omitted as unnecessary to this disclosure, such a transmission ordinarily has two rockshafts 6 and 7. A rockarm 8 on shaft 6, when oscillated between two end positions, causes rocking of the shaft 6 to shift a gear spool inside the transmission to effect selective mesh with a gear train in said transmission. An arm 9 similarly causes rocking of shaft 7 to shift another gear spool inside said transmission to effect two other selective mesh engagements with said gear train. A connecting rod 10 is connected to arm 8 and a similar rod 11 to the arm 9.

The device of the present invention comprises, generally, a bracket 15 that is connected, as by bolts 16, to the mounting means mentioned above, a bolt 17 extending through said bracket and constituting a pivot pin, a shift stick or lever 18 provided with an extension 19, a saddle member 20 pivotally mounted on said pin and connected to said stick extension, a helical spring 21 to bias the extension 19, and, therefore, the shift stick 18 to a position normal to the pin 17, two similar arms 22 and 23 pivotally mounted on the pin 17 with the saddle member 20 between them with thrust washers 24 interposed between each said arm and parts of the bracket 15, said arms 22 and 23 being each provided with a hole or slot 25, said slots being aligned, a lock bolt 26 mounted on the end of the stick extension 19, and a spring detent 27 operatively associated with the bolt 26 to releasably lock the neutral position of the shift stick.

The bracket 15 is shown as comprising a rear plate 30 and a front plate 31 with end walls 32 that terminate in ears 33. The bolts 16, by connecting said ears to the opposite ends of the rear plate 30, provide the bracket with the form of a space or enclosure in which the components 19 to 26 are disposed, at least in part. The pivot bolt 17 extends through aligned holes in said plates 30 and 31 and spans across the enclosure space of the bracket.

The portion of the shift stick 18 that is broken away is of generally conventional form. The lower portion that is shown is connected by bolts 34 to the extension 19 which is provided with an oversize hole 35 through which the pivot bolt 17 passes. At its end, said extension 19 is provided with a fixed bushing 36, the bore of which is transverse to the length of said extension.

The saddle member 20 has a U-shaped form that comprises a web 37 against which the lower end of the stick 18 bears, and two legs or flanges 38 that extend downwardly from said web with aligned holes therein through which the pivot bolt 17 passes. A slot 39 in said web 37 adjacent to one flange 38 is of a size to loosely receive the stick extension 19. The latter resides between said flanges 38 and is retained in normal position against one of said flanges by the spring 21. Due to the loose fit of extension 19 in slot 39, the stick 18 is capable of being tilted forwardly, causing the extension to tilt rearwardly against the bias of spring 21, as indicated in FIG. 4. The clearance of hole 35 around the pivot bolt 17 permits this tilt movement of extension 19.

The arms 22 and 23 are connected by their ends to the respective connecting rods 10 and 11, as shown in FIG. 2.

The lock bolt 26 extends into the bore of bushing 36, as limited by a flange 40, the bolt having an end 41 that extends from said bushing into the slot 25 of the arm 22. Said bolt is provided with an extension 42 that is directed toward the slot 25 of the arm 23 but does not extend into said slot when the stick extension 19 is in the normal spring-retracted position of FIGS. 2 and 3. The end of said bolt extension 42 is provided with a conical recess 43.

The spring detent 27 is shown as comprising a detent bolt 44 that has bearing in the bracket plate 30, extends through the slot 25 of the arm 23 and has a conical end projection 45 that, when aligned with the bolt 26, enters and is seated in the conical cavity or recess 43 of the bolt extension 42. A spring 46 biases the detent bolt 44 into such seated engagement with the bolt 26, an enclosing housing 47 being provided for said spring and for the detent bolt 44, when the latter is retracted and forming an abutment for said spring.

As seen in FIG. 2, the spring 46 projects the detent bolt 44 into the slot 25 of the arm 23, and the conical end 45 of said bolt 44 into the seat 43 of the bolt 26, thereby pressing the flange 42 of the latter bolt against the end of bushing 36 to extend the end 41 of the bolt 26 into the slot 25 of arm 23.

From this normal position, shift of the stick 18 in either direction will cause shift movement only of arm 22 and of the gearing in the transmission that is affected by rocking of shaft 6. The arm 23 will remain locked by the detent lock to prevent rocking movement of shaft 7. Upon return of the shift stick to neutral position, the bolts 26 and 44 will re-engage to retain said position.

The arm 23 is moved by the bolt extension 42 by the shift stick 18 by first pulling on said stick in a forward direction against the bias of the spring 21. This movement projects the bolt extension 42 into the slot 25 of arm 23 while said extension pushes on the conical end 45 of the detent bolt to retract the same from said slot. The arm 23 is thus freed and movement, in either direction of the shift stick, will cause shift movement, by the arm 23, of the gearing in the transmission 5 that is affected by rocking of shaft 7. Upon return of the stick 18 and the arm 23 to neutral position, the bolts 26 and 44 re-engage as before.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. Gearshift locking means comprising:
   (a) two arms for shifting the gears of a selective transmission,
   (b) a shift stick provided with an extension,
   (c) a pivot bolt for said arms and stick,
   (d) each arm having a hole therein, said holes being aligned when the arms are in neutral position,
   (e) a lock bolt carried by said stick extension and having an end extending into the hole of one arm to lock said arm to the shift stick extension so that shift of the stick moves said arm to shift gears of said transmission,
   (f) means mounting said stick and extension for manual movement at an angle to the plane of movement of the shift stick,
   (g) a spring-biased detent bolt normally extending into the hole of the other arm to lock the latter and in aligned engagement with the lock bolt,
   (h) said detent bolt being displaced by said lock bolt from the hole of the second arm to lock said arm to the shift stick extension so that shift of said stick moves said second arm to shift other gears of said transmission.

2. Gearshift locking means according to claim 1 in which the engaging ends of two bolts are provided with interfitting conical seat and projection means.

3. Gearshift locking means according to claim 1 in which the displacing end of the first bolt is provided with a conical seat, and the engaging end of the detent bolt is provided with a conical projection that enters said seat when the two arms are in neutral position.

4. Gearshift locking means comprising:
   (a) two arms for shifting the gears of a selective transmission,
   (b) a shift stick provided with an extension,
   (c) said shift stick including a U-shaft saddle member through a slot in which the mentioned extension loosely passes,
   (d) a common pivot bolt for said arms, stick and saddle member,
   (e) each arm having a hole therein, said holes being aligned when the arms are in neutral position,
   (f) a lock bolt carried by said stick extension and having an end extending into the hole of one arm to lock said arm to the shift stick extension so that shift of the stick moves said arm to shift gears of said transmission,
   (g) a spring member housed in said saddle member and around the pivot bolt biasing the stick extension in a direction to effect the mentioned locking by the lock bolt of said extension and the first arm, said extension upon manual forward movement against the bias of said spring moving the extension at an angle to the plane of movement of the stick shift,
   (h) a spring-biased detent bolt normally extending into the hole of the other arm to lock the latter and in aligned engagement with the lock bolt,
   (i) said detent bolt being displaced by said lock bolt from the hole of the second arm to lock said arm to the shift stick extension so that shift of said stick moves said second arm to shift other gears of said transmission.

5. Gearshift locking means according to claim 4 in which the engaging ends of two bolts are provided with interfitting conical seat and projection means.

6. Gearshift locking means according to claim 4 in which the displacing end of the first bolt is provided with a conical seat, and the engaging end of the detent bolt is provided with a conical projection that enters said seat when the two arms are in neutral position.

7. Gearshift locking means for shift mechanism having a shift stick:
   (a) two similar gear-shifting arms each having a hole therein and said holes being aligned,
   (b) a pivot bolt mounting said arms in transversed spaced relation,
   (c) an extension on the stick shift extending into the space between said arms,
   (d) a lock bolt carried by said stick extension and having an end extending into the hole of one arm to lock said arm to the shift stick extension so that shift of the stick moves said arm to shift gears of said transmission,
   (e) means mounting said stick and extension for manual movement at an angle to the plane of movement of the shift stick,
   (f) a spring-biased detent bolt normally extending into the hole of the other arm to lock the latter and in aligned engagement with the lock bolt,
   (g) said detent bolt being displaced by said lock bolt from the hole of the second arm to lock said arm to the shift stick extension so that shift of said stick moves said second arm to shift other gears of said transmission.

References Cited by the Examiner

UNITED STATES PATENTS

| | | | |
|---|---|---|---|
| 1,131,291 | 3/1915 | Thomas | 74—477 |
| 3,216,274 | 11/1965 | Hurst et al. | 74—476 |

MILTON KAUFMAN, *Primary Examiner.*